US009071794B2

(12) United States Patent
Shirai

(10) Patent No.: US 9,071,794 B2
(45) Date of Patent: Jun. 30, 2015

(54) IMAGE PROCESSING DEVICE CAPABLE OF READING A USER-IDENTIFYING IMAGE

(71) Applicant: Takaaki Shirai, Aichi (JP)

(72) Inventor: Takaaki Shirai, Aichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 14/039,991

(22) Filed: Sep. 27, 2013

(65) Prior Publication Data

US 2014/0029045 A1 Jan. 30, 2014

Related U.S. Application Data

(63) Continuation of application No. 12/694,716, filed on Jan. 27, 2010, now Pat. No. 8,576,423.

(30) Foreign Application Priority Data

Jan. 29, 2009 (JP) ................................ 2009-018215

(51) Int. Cl.
*G06K 15/00* (2006.01)
*H04N 1/44* (2006.01)

(52) U.S. Cl.
CPC ........... *H04N 1/4433* (2013.01); *H04N 1/4413* (2013.01); *H04N 1/444* (2013.01)

(58) Field of Classification Search
USPC ................ 707/1; 700/116; 382/306; 713/201
See application file for complete search history.

(56) References Cited

U.S. PATENT DOCUMENTS

| | | | |
|---|---|---|---|
| 4,211,483 A | 7/1980 | Hannigan et al. | |
| 5,235,681 A | 8/1993 | Masuzaki et al. | |
| 6,424,429 B1* | 7/2002 | Takahashi et al. | ........... 358/1.16 |
| 7,246,239 B2 | 7/2007 | Rodriguez et al. | |
| 7,979,019 B2 | 7/2011 | Yoshino | |

(Continued)

FOREIGN PATENT DOCUMENTS

| | | |
|---|---|---|
| JP | 55-115157 A | 9/1980 |
| JP | 7-203192 A | 8/1995 |

(Continued)

OTHER PUBLICATIONS

Notification of Reasons for Rejection dated Dec. 21, 2010 together with English language abstract.

(Continued)

*Primary Examiner* — Nicholas Pachol
(74) *Attorney, Agent, or Firm* — Scully, Scott, Murphy & Presser, PC

(57) ABSTRACT

An image processing device is provided. The image processing device includes a scanner to scan an image formed on a sheet, a first image obtainer to read and obtain a first image being a processible image formed in a first area, the first area being allocated on the sheet, a second image obtainer to read and obtain a second image formed in a second area, the second area being allocated on the sheet separately from the first area, a judging unit to judge as to whether the second image obtained by the second image obtainer is qualifies a predetermined authentication criteria and is identical to a predetermined identifying image, and a function controller to activate a predetermined function of the image processing device, which processes the processible image obtained by the first image obtainer, when the judging unit judges that the second image is identical to the predetermined identifying image.

4 Claims, 9 Drawing Sheets

(56) References Cited

U.S. PATENT DOCUMENTS

| | | |
|---|---|---|
| 2002/0023071 A1* | 2/2002 | Takahashi .................. 707/1 |
| 2002/0062206 A1 | 5/2002 | Liebchen |
| 2002/0157005 A1 | 10/2002 | Brunk et al. |
| 2003/0179412 A1* | 9/2003 | Matsunoshita ............. 358/1.14 |
| 2003/0210803 A1 | 11/2003 | Kaneda et al. |
| 2004/0042830 A1 | 3/2004 | Kaburagi et al. |
| 2004/0165769 A1 | 8/2004 | Huh et al. |
| 2005/0036651 A1 | 2/2005 | Wen |
| 2005/0038756 A1 | 2/2005 | Nagel |
| 2005/0094183 A1 | 5/2005 | Kojima |
| 2005/0111867 A1 | 5/2005 | Hatano |
| 2005/0141009 A1 | 6/2005 | Kiwada |
| 2005/0172151 A1* | 8/2005 | Kodimer et al. ............ 713/201 |
| 2005/0174601 A1* | 8/2005 | Sawada ..................... 358/1.15 |
| 2005/0207767 A1 | 9/2005 | Imayoshi et al. |
| 2006/0007471 A1 | 1/2006 | Okamoto et al. |
| 2006/0026434 A1 | 2/2006 | Yoshida et al. |
| 2006/0136087 A1* | 6/2006 | Higashiura ................. 700/116 |
| 2006/0197972 A1* | 9/2006 | Hayashi ..................... 358/1.14 |
| 2006/0290967 A1* | 12/2006 | Sumitomo et al. ......... 358/1.14 |
| 2007/0005611 A1 | 1/2007 | Takasugi et al. |
| 2007/0008569 A1* | 1/2007 | Shimazawa ................. 358/1.14 |
| 2007/0121174 A1 | 5/2007 | Higashiura |
| 2007/0177823 A1* | 8/2007 | Tredoux ..................... 382/306 |
| 2007/0182982 A1* | 8/2007 | Hayashida et al. ......... 358/1.14 |
| 2007/0223955 A1 | 9/2007 | Kawabuchi et al. |
| 2007/0245153 A1* | 10/2007 | Richtsmeier et al. ....... 713/186 |
| 2008/0025606 A1 | 1/2008 | Hanano |
| 2008/0092231 A1* | 4/2008 | Awata ........................ 726/19 |
| 2008/0093468 A1 | 4/2008 | Fan et al. |
| 2008/0130942 A1 | 6/2008 | Kitani |
| 2008/0130963 A1 | 6/2008 | Sakaue |
| 2008/0144071 A1* | 6/2008 | Uchikawa ................... 358/1.14 |
| 2008/0320604 A1* | 12/2008 | Nakajima et al. ........... 726/28 |
| 2009/0016615 A1* | 1/2009 | Hull et al. ................... 382/217 |
| 2009/0034002 A1 | 2/2009 | Shibaki et al. |
| 2009/0049541 A1* | 2/2009 | Ban ............................. 726/17 |
| 2009/0059287 A1* | 3/2009 | Yamada ..................... 358/1.15 |
| 2009/0119755 A1* | 5/2009 | Kodimer et al. ............ 726/4 |
| 2009/0161993 A1* | 6/2009 | Matsunoshita .............. 382/305 |
| 2009/0201543 A1* | 8/2009 | Tonami et al. .............. 358/1.15 |
| 2009/0228710 A1* | 9/2009 | Bergh et al. ................. 713/176 |
| 2009/0257076 A1 | 10/2009 | Qi et al. |
| 2010/0089992 A1* | 4/2010 | Kitada et al. ................ 235/375 |
| 2010/0091313 A1* | 4/2010 | Kitada et al. ................ 358/1.15 |
| 2010/0188683 A1 | 7/2010 | Shirai |

FOREIGN PATENT DOCUMENTS

| | | |
|---|---|---|
| JP | 9-307751 A | 11/1997 |
| JP | 2002-049281 A | 2/2002 |
| JP | 2005-65053 A | 3/2005 |
| JP | 2006-25255 A | 1/2006 |
| JP | 2006-335051 A | 2/2006 |
| JP | 2007-166229 A | 6/2007 |

OTHER PUBLICATIONS

Notification of Reasons for Rejection dated Aug. 16, 2011 received from the Japanese Patent Office from related Japanese Application No. 2009-018215, together with an English-language translation.

Japanese Official Action dated Dec. 21, 2010 from corresponding JP 2009-018218 together with English language translation cited in related application U.S. Appl. No. 12/695,592.

U.S. Official Action dated Sep. 20, 2012 from related application U.S. Appl. No. 12/695,592.

U.S. Office Action dated Mar. 28, 2013 from related application U.S. Appl. No. 12/695,592.

United States Official Action dated Sep. 13, 2013 from related U.S. Appl. No. 12/695,592.

United States Notice of Allowance dated Jun. 24, 2013 from related U.S. Appl. No. 12/694,716.

United States Official Action dated Dec. 19, 2012 from related U.S. Appl. No. 12/694,716.

Office Action dated Mar. 11, 2014 received in related U.S. Patent Application, namely U.S. Appl. No. 12/695,592.

Office Action dated Sep. 4, 2014 received in related U.S. Patent Application, namely U.S. Appl. No. 12/695,592.

US Official Action dated Mar. 11, 2015 from related U.S. Appl. 12/695,592.

* cited by examiner

| USER NAME | FIRST AUTHENTICATION DATA | FAX TRANSMISSION | i-FAX TRANSMISSION | COPY | SCAN TO USB |
|---|---|---|---|---|---|
| User1 | 1111 | PERMITTED (up to n transmissions) | PERMITTED (up to m transmissions) | PERMITTED (up to n copies) | × |
| User2 | 2222 | PERMITTED (up to n transmissions) | PERMITTED (up to m transmissions) | PERMITTED (up to n copies) | × |
| User3 | 3333 | × | × | PERMITTED (up to n copies) | × |
| ⋮ | ⋮ | ⋮ | ⋮ | ⋮ | ⋮ |
| Public | (None) | | | | |

FIG.2A

| USER NAME | SECOND AUTHENTICATION DATA |
|---|---|
| User1 | IDENTIFYING IMAGE DATA #1 |
| User2 | IDENTIFYING IMAGE DATA #2 |
| User3 | IDENTIFYING IMAGE DATA #3 |
| ⋮ | ⋮ |
| Public | (None) |

IMAGE PROCESSING DEVICE CAPABLE OF READING A USER-IDENTIFYING IMAGE

CROSS REFERENCE TO RELATED APPLICATION

This application is a continuation application of U.S. application Ser. No. 12/694,716 filed on Jan. 27, 2010, which claims benefit of Japanese Patent Application No. 2009-018215, filed on Jan. 29, 2009, the contents of both of which are hereby incorporated by reference into the present application.

BACKGROUND

1. Technical Field

An aspect of the present invention relates to an image processing device capable of permitting and restricting usage of functions provided to the image processing device on basis of a user and a computer readable storage medium therefor.

2. Related Art

Conventionally, an image processing device having a plurality of functions has been known. The plurality of functions may be, for example, a printing function, a scanning function, a copier function, a facsimile receiving/transmission function, and a data transferring function. The image processing device may have an authentication function to authenticate users so that usage of the functions of the image processing device is allowed only to approved users.

Such an image processing device with the authentication function is generally configured to receive identifying information to identify the user, such as a user name and a password, and permit usage of specific functions when the identifying information is confirmed.

SUMMARY

When the image processing device requiring authentication, however, the user is required to manually input the identifying information through an input device (e.g., operation panel with keys). The inputting operation may be redundant and troublesome specifically when the input device is provided with a small number of keys. Manipulating the small number of keys to enter the identifying information may be troublesome and may occasionally provoke input errors.

In view of the above drawback, the present invention is advantageous in that an image processing device, capable of authenticating specific users without requiring the users to manually input the identifying information, is provided. Further, a computer readable storage medium for the image processing device is provided.

According to an aspect of the present invention, an image processing device is provided. The image processing device includes a scanner to scan an image formed on a sheet, a first image obtainer to read and obtain a first image being a processible image formed in a first area, the first area being allocated on the sheet, a second image obtainer to read and obtain a second image formed in a second area, the second area being allocated on the sheet separately from the first area, a judging unit to judge as to whether the second image obtained by the second image obtainer qualifies a predetermined authentication criterion and is identical to a predetermined identifying image, and a function controller to activate a predetermined function of the image processing device, which processes the processible image obtained by the first image obtainer, when the judging unit judges that the second image is identical to the identifying image.

According to another aspect of the present invention, a computer readable storage medium storing computer readable instructions is provided. The computer readable instructions cause a computer to process an image by executing steps of reading and obtaining a first image, which is a processible image formed in a first area, the first area being allocated on a sheet, reading and obtaining a second image, which is formed in a second area, the second area being allocated on the sheet separately from the first area, judging as to whether the obtained second image qualifies a predetermined authentication criterion and is a predetermined identifying image, and activating a predetermined function of the computer, which processes the obtained first image being the processible image, when the second image is judged to be identical to the identifying image.

BRIEF DESCRIPTION OF THE ACCOMPANYING DRAWINGS

FIG. 2A illustrates information to be stored in a functional limitation storage area of a storage unit in the MFP according to the embodiment of the present invention. FIG. 2B illustrates information to be stored in an identifying image data storage area of a storage unit in the MFP according to the embodiment of the present invention.

DETAILED DESCRIPTION

Figure 1A:
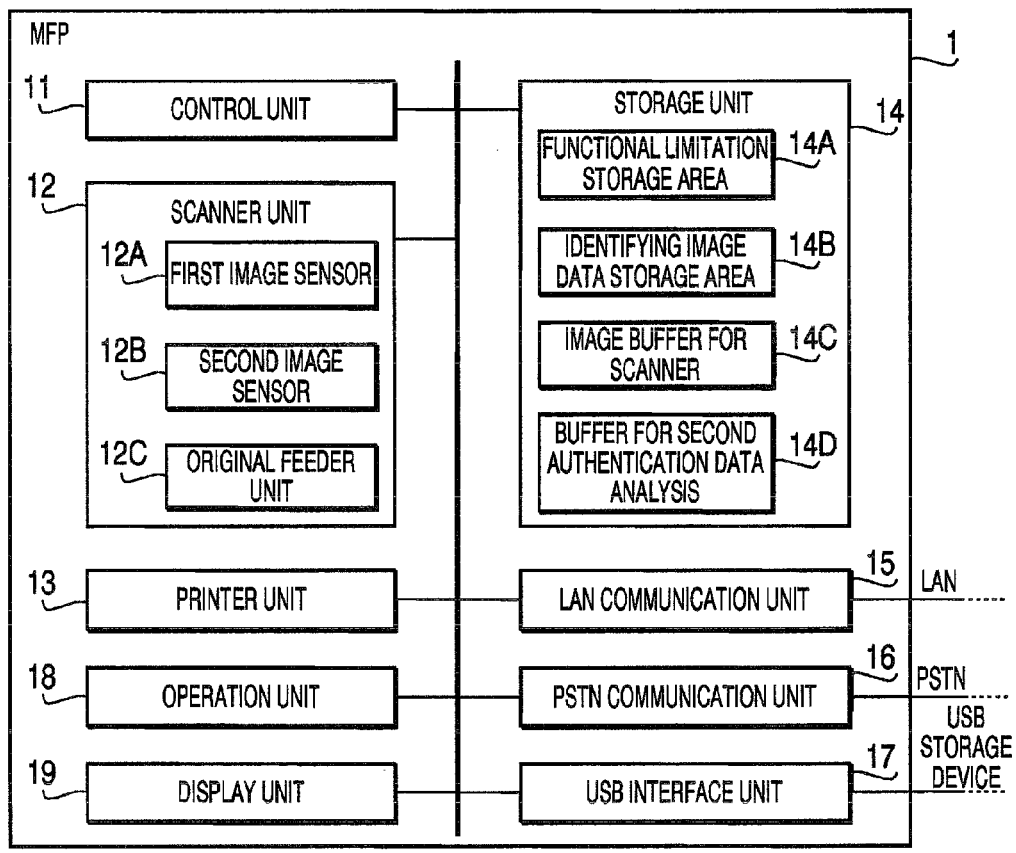
FIG. 1A is a block diagram to illustrate an electrical configuration of a multifunction peripheral device (MFP) according to an embodiment of the present invention.

Hereinafter, an embodiment according to the present invention will be described with reference to the accompanying drawings. Firstly, an overall configuration of an MFP 1 according to the present embodiment will be described with reference to FIG. 1A.

The MFP 1 is a multifunction device having a plurality of implements such as a printing function, a scanning function, a copier function, a facsimile communication function, and i-FAX (internet facsimile) communication function. The MFP 1 further has a function to transmit data representing a scanned image to a USB-enabled storage device (so-called Scan-to-USB function). In order to implement these functions, the MFP 1 is provided with a control unit 11, a scanner unit 12, a printer unit 13, a storage unit 14, a LAN communication unit 15, a PSTN (public switched telephone networks) communication unit 16, a USB interface unit 17, an operation unit 18, and a display unit 19.

The control unit 11 includes a microcomputer (not shown) with a CPU, a ROM, and a RAM. The control unit 11 control entire behaviors of the MFP 1.

The scanner unit 12 includes a first image sensor 12A, a second image sensor 12B, and an original feeder unit 12C. The first image sensor 12A and the second image sensor 12B are devices to optically read an image formed on an original sheet. The original feeder unit 12C is a device to feed a plurality of original sheets to the first and second image sensors 12A, 12B separately one by one.

A configuration of the scanner unit 12 will be described with reference to FIG. 1B. The first image sensor 12A is arranged along a feeding path of the original sheet in a position, in which the first image sensor 12A can read an obverse side D1 of the original sheet being fed by the original feeder unit 12C. The second image sensor 12B is arranged along the feeding path in a position, in which the second image sensor 12B can read a reverse side D2 of the original sheet being fed by the original feeder unit 12C. Accordingly, the images formed on the obverse side and the reverse side of the original sheet can be read respectively by the first image sensor 12A and the second image sensor 12B concurrently.

Figure 1B:
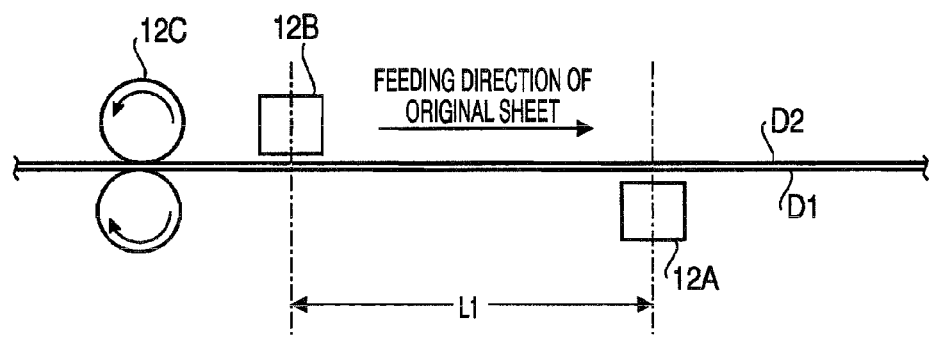
FIG. 1B illustrates a schematic view of a scanner unit in the MFP according to the embodiment of the present invention.

As illustrated in FIG. 1A, the first image sensor 12A and the second image sensor 12B are located in positions to be apart from each other for a length L1 along the feeding path; therefore, the second image sensor 12B starts reading the reverse side D2 prior to the first image sensor 12A reading the obverse side D1. The first image sensor 12A starts reading the obverse side D1 when the original sheet reaches a position opposing the first image sensor 12A along the feeding path.

The printer unit 13 is a printing device to form an image on a recording sheet. The image to be formed on the recording sheet may be obtained through the scanner unit 12 reading the original image or through the facsimile receiving function of the MFP 1.

The storage unit 14 includes a non-volatile memory area provided by, for example, a hard disk drive and an NVRAM and a temporary memory area provided by, for example, a RAM. The non-volatile memory area in the storage unit 14 has a functional limitation storage area 14A and an identifying image data storage area 14B. Information stored in the non-volatile memory area is maintained even after the MFP 1 is powered off. The temporary memory area has an image buffer 14C for scanner. When the scanner unit 12 reads an image, data representing the image is stored in the image buffer 14C. Further, a buffer area 14D to be used for analyzing obtained second authentication data is provided.

The LAN communication unit 15 includes a communication interface to connect the MFP 1 to a local area network (LAN) so that the MFP 1 can exchange data with other external devices (not shown) through the LAN. When the LAN, to which the MFP 1 is connected, is further connected to a wide area network (WAN) such as the Internet through a gateway, the MFP 1 can communicate with other external devices outside the LAN through the WAN. The data exchange through the LAN communication unit 15 can be performed by the i-FAX function of the MFP 1.

The PSTN communication unit 16 includes devices such as a facsimile modem and audio CODEC, which are required to connect the MFP 1 to the PSTN. The MFP 1 can communicate with other PSTN-enabled external devices (e.g., a facsimile machine; not shown) through the PSTN. The data exchange through the PSTN can be performed by the PSTN communication unit 16.

The USB interface unit 17 includes an interface to connect the MFP 1 to a USB-enabled storage device. When, for example, the MFP 1 utilizes the Scan-to-USB function, the data representing the image scanned by the scanner unit 12 can be transferred to the USB-enabled storage device through the USB interface unit 17.

Next, authenticating function to authenticate users of the MFP 1 will be described. In the present embodiment, specific functions among the plurality of functions provided to the MFP 1 are available to approved users when a function-locking function is activated in the MFP 1. The users can be approved in two methods, which are a first authentication method and a second authentication method in the present embodiment.

In the first authentication method, a user is required to manipulate the operation unit 18 to select a user name and enter first authentication data (i.e., a password) corresponding to the user name. In the second authentication method, an identifying image formed in a predetermined area of a sheet is read by the scanner unit 12.

Firstly, the first authentication method will be described with reference to FIG. 2A. In order to accomplish the first authentication method, a plurality of sets of data are stored in the functional limitation storage area 14A in the storage unit 14. Each data set includes six entries, which are "User name," "First authentication data," "Fax transmission," "i-Fax transmission," "Copy," and "Scan-to-USB," and each data set corresponds to a specific user. The information in the fields "Fax transmission," "i-Fax transmission," "Copy," and "Scan-to-USB" respectively indicates permission for the user to use the facsimile transmission function, the i-FAX transmission function, and the Scan-to-USB function. The fields further include information which indicates, when the user is permitted to use the function, a permitted number of times to use the function. Thus, the information stored in the functional limitation storage area 14A indicates usability of the functions installed in the MFP 1 on basis of the user.

The fields "User name" and "First authentication data" include character strings to which the MFP 1 refers when the MFP 1 checks authenticity of the user in the first authentication method. In the present embodiment, the character strings are provided to the user by an administrator of the MFP 1.

The user name and the first authentication data are registered in the functional limitation storage area 14A by the administrator in advance, and the user is informed thereof by the administrator later. When the user attempts to use one of the functions in the MFP 1, which requires authentication of the user in the first authentication method, the user manipulates the operation unit 18 to select the given user name and enter the given first authentication data.

When the user name and the first authentication data are entered, the MFP 1 refers to the information registered in the functional limitation storage area 14A and compares the entered user name and the entered first authentication data with the registered user name and the registered first authentication data. When the entered information and the registered information match, the MFP 1 authenticates the user, and the user is allowed to login with the user name.

When the user is authenticated, the MFP 1 refers to the information in one of the entries "Fax transmission," "i-Fax transmission," "Copy," and "Scan-to-USB", which corresponds to the function desired by the user, in the data set. Thus, the MFP 1 judges as to whether the current user is permitted to use the desired function. Further, if the user is permitted to use the function, the MFP 1 further judges as to whether the current usage by the current user is within the limited number assigned by the administrator.

The information indicated in the entries "Fax transmission," "i-Fax transmission," "Copy," and "Scan-to-USB" has been, similarly to the user name and the first authentication data, registered in the functional limitation storage area 14A by the administrator in advance.

An example of authentication of a user will be described. When, for example, information as shown in FIG. 2A is registered in the functional limitation storage area 14A, and a user manipulates the operation unit 18 to select a user name "User1" and enter first authentication data "1111," the MFP 1 authenticates the user.

Once the user is authenticated, the MFP 1 refers to the data set in the functional limitation storage area 14A corresponding to the user and permits one of facsimile transmission, i-FAX transmission, and copying within the limiting number assigned by the administrator and indicated in the fields. When the user desires to use the Scan-to-USB function, however, the MFP 1 prohibits the user from using the function. When the user wishes to use the function, but the user has experienced to use the function for the limited number of times, the user is no longer permitted to use the function.

When a different user attempts to use the MFP 1, authenticity of the different user is similarly examined, and the MFP 1 provides the desired function based on the permission and restriction indicated in the functional limitation storage area 14A. For example, when a user with a user name "User3" is authenticated, the user is permitted to use the copier function up to the number indicated in the "Copier" field corresponding to the user. Meanwhile, usage of the facsimile transmission function, i-FAX transmission function, and the Scan-to-USB function is prohibited.

When a user fails in the authentication, or when a predetermined time period elapses after successful authentication, the MFP 1 operates in a "public" mode, in which usage of the functions is permitted or restricted in accordance with information in a data set for "Public" users as registered in the functional limitation storage area 14A (see a lowermost row in FIG. 2A).

Therefore, the functions of the MFP 1, of which usage is permitted to public by the administrator, can be used even when the user is not authenticated. The usable functions open to public in the public mode are determined by discretion of the administrator. In general, however, the usability of the functions open to public may be restricted to be narrower compared to the usability of the functions based on authentication.

Next, the second authentication method will be described with reference to FIG. 2B. In order to accomplish the second authentication method, a plurality of sets of data are stored in the identifying image data storage area 14B in the storage unit 14. Each data set includes two entries, which are "User name" and "second authentication data." Each data set is registered in correspondence with a user.

The users (i.e., the character strings in the "User name" field) registered in the identifying image data storage area 14B are identical to the users registered in the functional limitation storage area 14A. Thus, the data sets registered in the functional limitation storage area 14A and the identifying image data storage area 14B are associated with each other on the basis of the user names.

The second authentication data in the present embodiment is data representing a personal identifying image to be used for authentication. Alternatively, the second authentication data may be criterial data for the MFP 1 to judge authenticity of a personal identifying image. The criterial data may be, for example, when the personal identifying image is a bar-code image, binary data represented by the bar-code image. For another example, the criterial data may be, when the personal identifying image is an image representing a character string, text data which can be extracted from the image through an OCR operation. In the present embodiment, the second authentication data is a piece of data representing an image of an imprinted personal seal.

According to the present embodiment, when the image data representing an imprinted personal seal is used as the second authentication data, an image of an imprinted personal seal provided by the user is scanned by the scanner unit 12 to generate the image data representing the imprinted seal. The image data is thus registered in the identifying image data storage area 14B by the administrator. After the registration, the user can be authenticated in the second authorization method.

When the MFP 1 authenticates the user according to the second authentication method, the user manipulates the operation unit 18 to activate a function (e.g., facsimile transmission, copier, etc.) involving the scanning behavior of the scanner unit 12.

When the function is activated, the MFP 1 controls the scanner unit 12 to read an image formed in a predetermined area on an original sheet. In the present embodiment, the identifying image is formed in a predetermined image area for authentication, which occupies a part of the original sheet. The image read by the scanner unit 12 is compared with the image data represented by the second authentication data, which is registered in the image authentication data storage 14B. Alternatively, binary data or image data representing the scanned image is compared with the second authentication data. When the image data obtained by the scanner unit 12 and the second authentication data match, the user who has the original sheet with the image formed in the predetermined identifying image area is authenticated.

When the user is authenticated, the MFP 1 refers to the information in the one of the entries "Fax transmission," "i-Fax transmission," "Copy," and "Scan-to-USB", which corresponds to the function desired by the user, in the data set registered in the functional limitation storage area 14A. Thus, the MFP 1 judges as to whether the current user is permitted to use the desired function. Further, if the user is permitted to use the function, the MFP 1 further judges up to how many times the user is permitted to use the function.

When the user fails to be authenticated, or when the user is prohibited from using the desired function, the MFP 1 manipulates the scanner unit 12 solely to read the identifying image but prohibits the user from using the desired function.

In the present embodiment, the administrator can preset the authentication method to be used in the MFP 1. The MFP 1 may authenticate the user solely in the first authentication method or in the second authentication method according to the administrator's discretion. Alternatively, the MFP 1 may authenticate the user in the first authentication method together with the second authentication method.

When the second authentication method is used in the MFP 1, a range for the identifying image area to be laid out in an original sheet may be determined by the administrator. Examples of the identifying image areas will be described with reference to FIGS. 3A, 3B, 4A, and 4B.

Figure 3A:
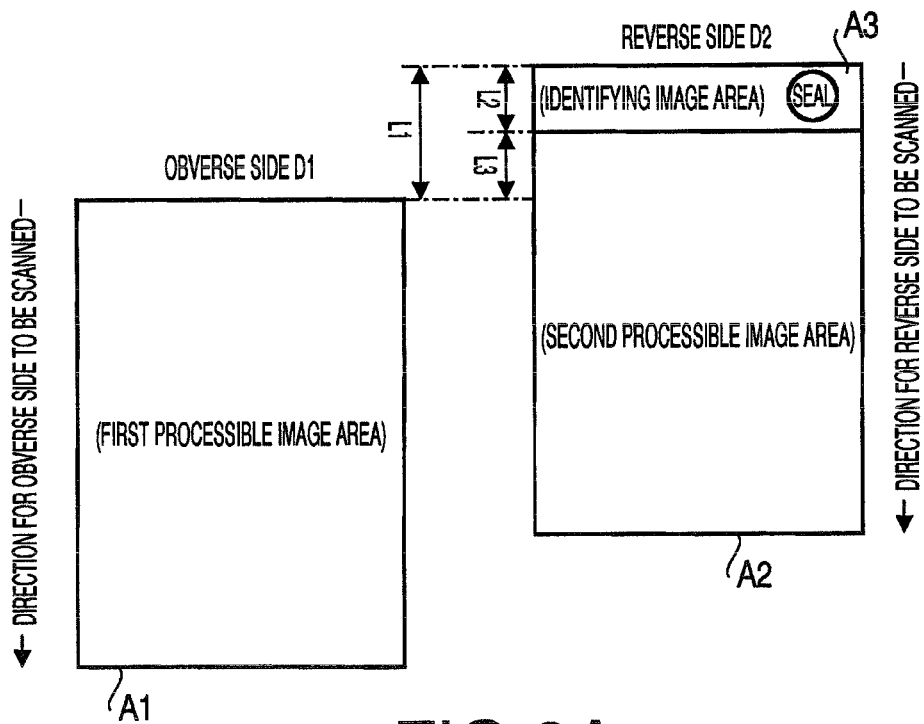
FIGS. 3A and 3B illustrate image forming areas and identifying image areas on obverse sides and reverse sides of original sheets to be fed in the MFP according to the embodiment of the present invention.

FIG. 3A shows a first example of an original sheet with an obverse side D1 and a reverse side D2 to be fed in the scanner unit 12 of the MFP 1. The original sheet has an image to be processed (e.g., copied) by the MFP 1 on each side D1, D2. The obverse side D1 includes a first processible image area A1, in which the image to be processed can be formed. The reverse side D2 includes a second processible image area A2. The reverse side D2 further includes the identifying image area A3.

It is to be noted in FIG. 3A that the obverse side D1 and the reverse side D2 are drawn in vertically displaced positions with respect to each other. Specifically, the reverse side D2 is in a position higher than the obverse side D1 for a length L1. The positional relation of the obverse side D1 and the reverse side D2 represents positions to be scanned by the scanner unit 12 simultaneously. That is, in the MFP 1, as has been described above, the first image sensor 12A and the second image sensor 12B are apart from each other for the length L1, and the reverse side D2 starts being scanned by the second image sensor 12B before the obverse side D1 starts being scanned by the first image sensor 12A (see FIG. 1B). Therefore, the obverse side D1 starts being scanned at a time point later for a period corresponding to the length L1 than a time point in which the reverse side D2 starts being scanned.

The identifying image area A3 is allocated in a range corresponding to a length L2 (see FIG. 3A). The length L2 is equal to the length L1 subtracted by a length L3 (L2=L1−L3). In the MFP 1 according to the present embodiment, relation between a feeding speed to carry the original sheet in the feeding path by the original feeder unit 12C and the length L3 is optimized to be such that, when the original feeder unit 12C feeds the original sheet in a predetermined speed, a time period required to carry the original sheet for the length L3 exceeds a time period in which the user is authenticated in the second authentication method.

Under the above-described condition, the range for the identifying image area A3 corresponding to the length L2 is determined within the limitation in consideration of the length L3. In particular, the user may enter a value indicating the length L2 through the operation unit 18. Alternatively, for example, the MFP 1 may present several preset options for the length L2 to the user so that the user can select one of the options to set the length L2. In either way, the length L2 is set within the range in which the length L3 is maintained.

According to the above configuration, when the second image sensor 12B scans the identifying image area A3 and successively starts scanning the second processible image area A2, the MFP 1 can starts checking authenticity of the user based on the image formed in the identifying image area A3. Thus, authentication in the second authentication method is completed before the first image sensor 12A starts scanning the first processible image area A1.

When the user fails in the authentication, scanning of the first processible image area A1 can be canceled so that the first processible image area A1 is not scanned for the unapproved user. In the present example, when the identifying image area A3 is determined within the limited range, a remaining portion of the reverse side D2 is automatically determined to be the second processible image area A2.

According to the above example, the redundant scanning of the first processible image area A1 is prevented by optimizing the length L3, which is based on the condition that the original feeder unit 12C carries the original sheet in a predetermined speed steadily. However, the redundant scanning of the first processible image area A1 can be prevented if the original feeder unit 12C is configured to be such that the original sheet is stopped at a predetermined position when scanning of the identifying image area A3 is completed.

With this configuration, the scanning operation can be stopped upon completion of scanning of the identifying image area A3; therefore, solely the authenticating process can be executed without scanning the second processible image area A2. When the user fails in the authentication, similarly to the configuration in which the original sheet is carried in the steady speed, redundant scanning of the first processible area A1 can be prevented. Further, unlike the configuration in which the original sheet is carried in the steady speed, redundant scanning of the second processible image area A2 can be avoided.

Furthermore, the once-stopped feeding behavior of the original feeder unit 12C is resumed, after completion of authentication in the second authentication method. Therefore, no optimization of the relation between the feeding speed and the length L3 is necessary. Rather, a desired range can be determined to be the identifying image area A3.

Figure 3B:
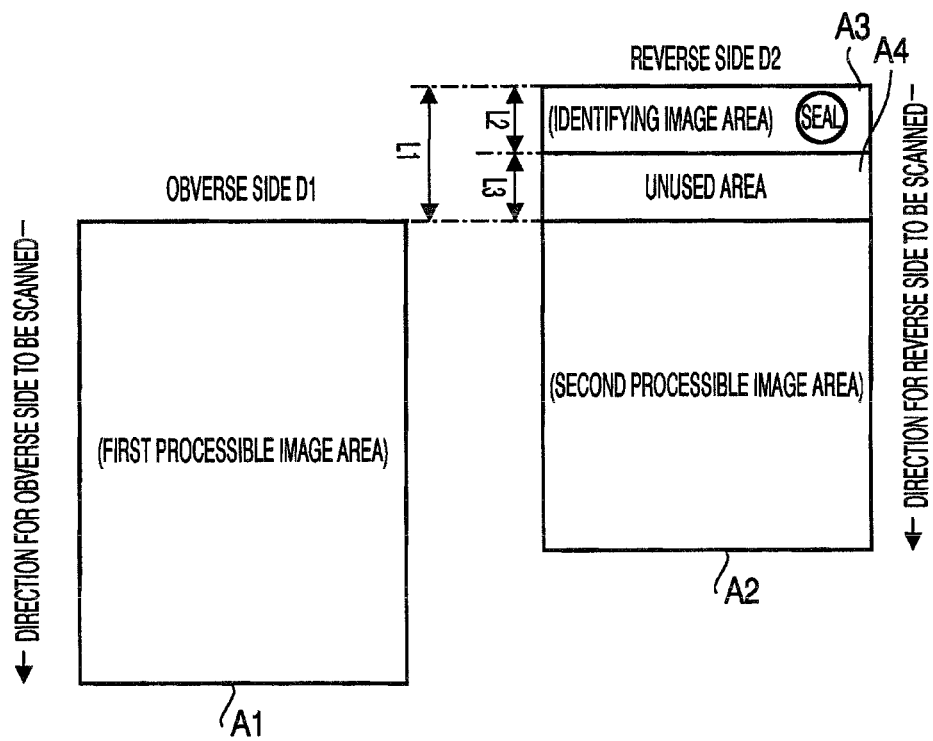

Next, a second example of the processible image areas and the identifying image area A3 will be described with reference to FIG. 3B. FIG. 3B shows an original sheet with an obverse side D1 and a reverse side D2 to be fed in the scanner unit 12 of the MFP 1. The obverse side D1 includes the first processible image area A1, and the reverse side D2 includes the second processible image area A2 and the identifying image area A3. Further, the reverse side D2 includes an unused area A4 in an area corresponding to the range of the length L3.

In the second example, the identifying image area A3 can be determined similarly to the identifying image area A3 in the first example. A range for the unused area A4 is determined accordingly. In the second example, the range for second processible image area A2 is constant.

With the unused area A4 on the reverse side D2, feeding of the original sheet steadily in a constant speed is accomplished whilst the redundant scanning of the first processible image area A1 and the second processible image area A2 is avoided upon authentication failure.

That is, when scanning of the identifying image area A3 is completed, the feeding behavior of the original feeder unit 12C is not stopped but continued. Meanwhile, scanning of the unused area A4 is omitted. Authentication of the user is completed whilst the original sheet is carried for the length L3. Thus, when the user is authorized, scanning of the first processible image area A1 and the second processible image area A2 is simultaneously started.

With the above configuration, although the second processible image area A2 is narrowed by the unused area A4, the original sheet can be fed continuously without a pause. Therefore, the user can recognize continuous operation of the MFP 1 including the authentication and the succeeding scanning of the first processible image area A1 and the second processible image area A2. Meanwhile, redundant scanning of the first processible image area A1 and the second processible image area A2 can be prevented when the user fails in authentication.

Figure 4A:
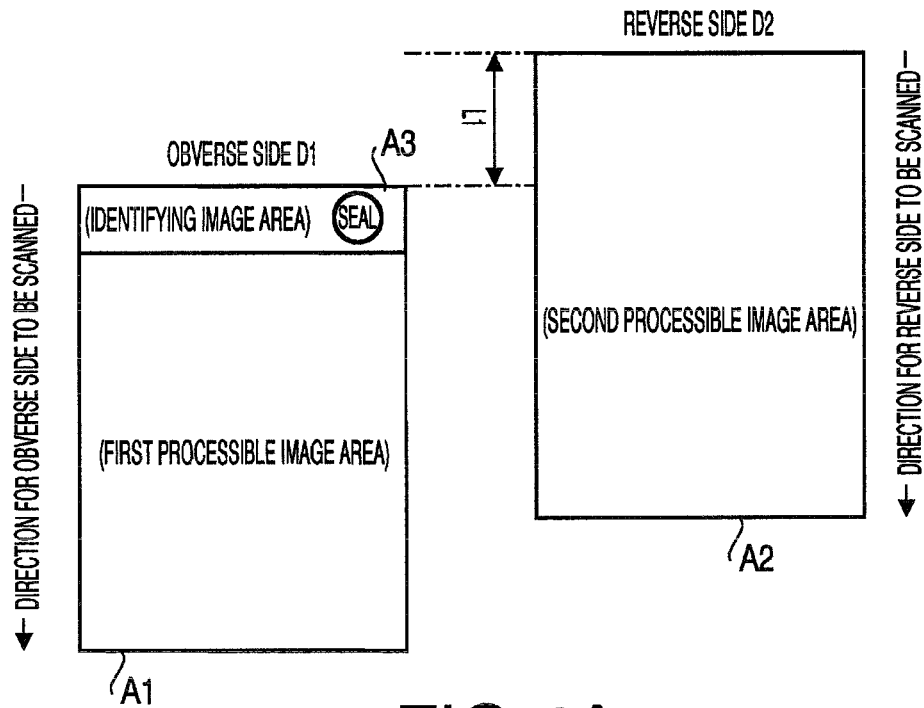
FIGS. 4A and 4B illustrate image forming areas and identifying image areas on obverse sides and reverse sides of recording sheets to be fed in the MFP according to the embodiment of the present invention.

Next, a third example of the first and second processible image areas A1, A2 and the identifying image area A3 will be described with reference to FIG. 4A. FIG. 4A shows an original sheet with an obverse side D1 and a reverse side D2 to be fed in the scanner unit 12 of the MFP 1. The obverse side D1 includes the first processible image area A1 and the identifying image area A3, and the reverse side D2 includes the second processible image area A2. In the third example, the identifying image area A3 is not included in the reverse side but is included in the obverse side D1. The identifying image area A3 can be determined similarly to the identifying image area A3 in the first example. A range for the first processible image area A1 to be laid out is determined accordingly.

The identifying image area A3 can be thus arranged on the obverse side D1, and the MFP 1 can check authenticity of the user without problem. However, with the identifying image area A3 in the position as shown in FIG. 4A, the scanner unit 12 scans the second processible image area A2 prior to completion of the authentication and uses some of the storage area in the storage unit 14. Therefore, when the user fails in the authentication, the storage area used in the preceding scanning operation is to be aborted. In such a case, the preceding scanning operation results in waste.

When the user fails in authentication in the second authentication method, however, the user may subsequently attempt to be approved in the first authentication method. Thus, data generated in the preceding scanning operation, which is conducted prior to completion of authentication in the second authentication method, may be used when the user is approved in the first authentication method.

Further, with the identifying image area A3 in the position as shown in FIG. 4A, and when the original sheet is fed in a constant speed, the first processible image area A1 is also scanned prior to completion of the authentication in the second authentication method. Therefore, data obtained in the preceding scanning operation to scan the first processible image area A1 can be wasted. In order to avoid the redundant preceding scanning operation, the feeding behavior of the original feeder unit 12C can be stopped temporarily to wait until completion of the authentication.

Figure 4B:
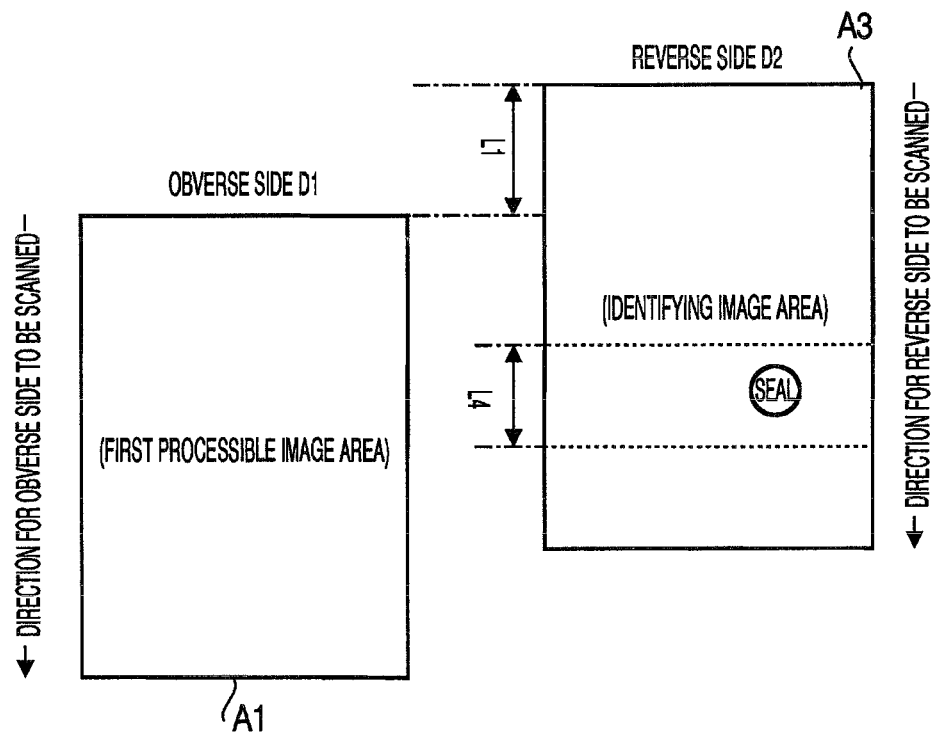
Figure 5:
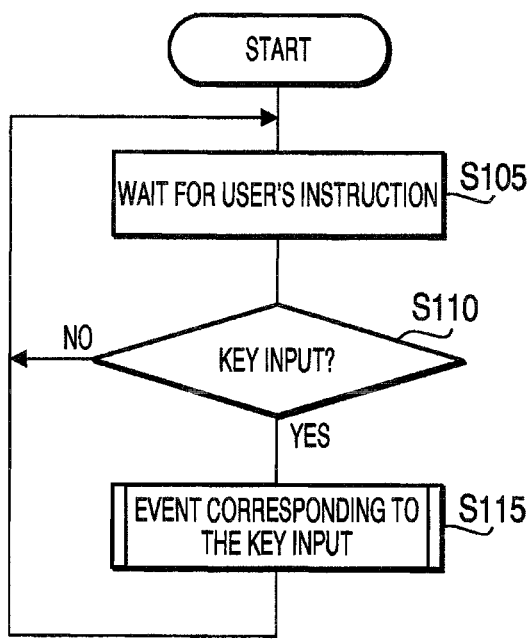
FIG. 5 is a flowchart to illustrate a main operation flow in the MFP according to the embodiment of the present invention.

Next, a fourth example of the processible image area A1 and the identifying image area A3 will be described with reference to FIG. 4B. FIG. 4B shows an original sheet with an obverse side D1 and a reverse side D2 to be fed in the scanner unit 12 of the MFP 1. The obverse side D1 includes the first processible image area A1, and the reverse side D2 includes the identifying image area A3. In the fourth example, the reverse side D2 does not include the second processible image area A2.

In the fourth example, it is required that the user informs the MFP 1 of that the identifying image area A3 is arranged on the reverse side D2 of the original sheet in advance. Thereafter, when the user activates a scanning operation of the original sheet, the user sets the MFP 1 to scan solely one side of the original sheet.

When the instruction to scan the single side only is given, and when the second authentication method is not designated, the MFP 1 scans the original sheet by use of solely the first image sensor 12A.

Meanwhile, when the second authentication method is designated, the MFP 1 scans the original sheet by use of both of the first image sensor 12A and the second image sensor 12B even though the instruction to scan the single side only is given. Accordingly, the identifying image in the identifying image area A3 on the reverse side D2 is scanned by the second image sensor 12B whilst the processible image in the first processible image area A1 on the obverse side D1 is scanned by the first image sensor 12A.

Thus, the obverse side D1 and the reverse side D2 of the original sheet are respectively are separately used as the first processible image area A1 and the identifying image area A3 respectively. Therefore, the reverse side D2 can be entirely and distinctly used as the identifying image area A3 whilst the range for the identifying image area A3 may be indistinct to the user when the identifying image area A3 is arranged along with the first or second processible image area A1 or A2 on a same side of the original sheet.

Additionally, when the obverse side D1 and the reverse side D2 are distinctly used as the first processible image area A1 and the identifying image area A3 respectively, solely a partial range of the reverse side D2 may still be used as the identifying image area A3. The remaining of the reverse side D2 may be determined to be the unused area A4.

Alternatively, the processible image area A1 may be assigned to the reverse side D2, and the identifying image area A3 may be assigned to the obverse side D1 of the original sheet.

When the image data representing the imprinted personal seal is used as the second authentication data, sizes of imprinted personal seals are generally within an assumable range. Therefore, even when one of the obverse and reverse sides D1, D2 of the original sheet is entirely used as the identifying image area A3, merely a small range in the identifying image area A3 may be occupied by the identifying image. In such a case, therefore, examination of presence and absence of the identifying image may not necessarily wait until the entire identifying image area A3 is scanned. For example, a predetermined range corresponding to a length L4 may be scanned to detect the identifying image. When the identifying image is not detected after analyzing the scanned area, the range to be scanned is shifted in turn along the direction of the original sheet to be scanned. In this scan-and-analysis method, a volume of the image buffer 14C to be used in the scanning operation can be reduced, compared to a volume of the image buffer 14C to be used in the entire scanning of the reverse side D2, so that the storage areas in the storage unit 14 can be effectively used.

The settings of the first and second processible image areas A1, A2 and the identifying image area A3 can be selected by the user from the options described above. Alternatively, one of the options may be fixedly set in the MFP 1.

Next, flows of operations to utilize the above authentication methods in the MFP 1 will be described with reference to FIGS. 5 through 9.

A main operation flow of the MFP 1 is activated when the MFP 1 is powered on and conducted by the CPU in the control unit 11. When the flow starts, in S105, the MFP 1 waits for a user's input through a key. In S110, the MFP 1 judges as to whether the user's input is given. When no input is detected (S110: NO), the MFP 1 returns to S105. Thus, the MFP 1 repeats S105-S110 until the user's input is detected.

When the user's input through a key is detected (S110: YES), in S115, the MFP 1 recognizes an event corresponding to the manipulated key and behaves accordingly to the event. After completion of the event, the MFP 1 returns to S105.

In S115, the behavior of the MFP 1 to be performed varies depending on the key manipulated by the user. In the MFP 1 according to the present embodiment, the behavior can be one of user registration, function-locking, and function-controlling. These behaviors of the MFP 1 will be described hereinbelow.

Figure 6:
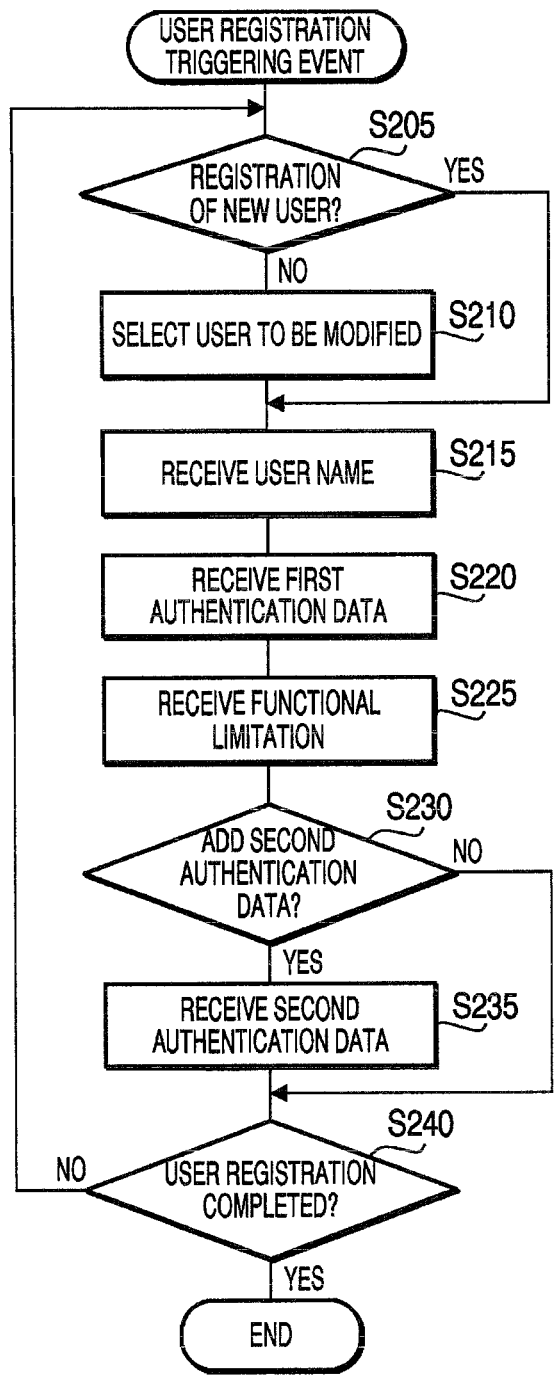
FIG. 6 is a flowchart to illustrate a flow of user registration executed in the MFP according to the embodiment of the present invention.

The flow of user registration will be described with reference to FIG. 6. The flow of user registration is activated upon a triggering event, which is manipulation of the corresponding key by the administrator of the MFP 1.

When the flow starts, in S205, the MFP 1 judges as to whether the registration is for registering a new user. In the MFP 1 according to the present embodiment, registration of a user includes registering a new user and modifying information concerning an existing user who is already registered. Therefore, the administrator informs the MFP 1 of as to whether the current registration is registering a new user by manipulating a predetermined key in the operation unit 18. In S205, therefore, the MFP 1 judges based on the manipulated key as to whether the current registration is for registering a new user.

In S205, when the MFP 1 determines that the current registration is not for registering a new user (S205: NO), in S210, the MFP 1 prompts the administrator to select an existing user, of which information is to be modified, and receives the administrator's selection. The flow proceeds to S215. In S205, when the MFP 1 determines that the current registration is for registering a new user (S205: YES), the MFP 1 skips S210 and proceeds to S215.

In S215, the MFP 1 receives information concerning the user to be registered or modified. When the current registration is for registering a new user, the administrator enters a new user name. When the current registration is for modifying an existing user, if necessary, the administrator modifies at least a part of the existing user name. The entered or modified user name is stored in the functional limitation storage area 14A.

In S220, the MFP 1 receives information concerning the first authentication data. When the current registration is for registering a new user, the administrator enters first authentication data corresponding to the new user. When the current registration is for modifying an existing user, if necessary, the administrator modifies the first authentication data corresponding to the existing user. The entered or modified first authentication data is stored in the functional limitation storage area 14A. The flow proceeds to S225.

In S225, the MFP 1 receives limitation concerning usage of the functions of the MFP 1, which are facsimile transmission, i-FAX transmission, copier, and Scan-to-USB. When the current registration is for registering a new user, the administrator enters limitation on the functions permitted to the new user. When the current registration is for modifying an existing user, if necessary, the administrator modifies the limitation on the functions permitted to the existing user. The entered or modified limitation is stored in the functional limitation storage area 14A. The flow proceeds to S230.

In S230, the MFP 1 judges as to whether the second authentication data is to be registered. The administrator can inform the MFP 1 of registration of the second authentication data by manipulating a predetermined key in the operation unit 18. In S230, therefore, the MFP 1 judges based on the manipulated key as to whether the administrator registration of the second authentication data is requested.

In S230, when the MFP 1 determines that registration of the second authentication data is requested (S230: YES), in S235, the MFP 1 receives second authentication data corresponding to the user. When the current registration is for registering a new user, the administrator enters second authentication data corresponding to the new user. When the current registration is for modifying an existing user, if necessary, the administrator modifies the second authentication data corresponding to the existing user. The entered or modified second authentication data is stored in the identifying image data storage area 14B. The flow proceeds to S240.

In S235, specifically, the administrator sets a sheet having an image of an imprinted personal seal, provided by the user being registered, in the scanner unit 12 and instructs the MFP 1 to extract the second authentication data from the scanned sheet. The MFP 1 therefore scans the sheet and extracts pixels containing a color component of a specific type of ink from the read image. Thus, the second authentication data, i.e., image data representing the imprinted personal seal, is generated and stored in the identifying image storage area 14B. Following S235, the flow proceeds to S240. In 230, when the MFP 1 determines that the current registration does not require registration of the second authentication data (S230: NO), the MFP 1 skips S235 and proceeds to S240.

In S240, the MFP 1 judges as to whether the user registration is completed (S240). The administrator can inform the MFP 1 of completion of the user registration by manipulating a predetermined key in the operation unit 18. In S240, therefore, the MFP 1 judges completion of the user registration based on the manipulated key.

In S240, when the MFP 1 determines that the administrator requests for further user registration and the user registration is not completed (S240: NO), the flow returns to S205, and the MFP 1 repeats S205-S240. When the MFP determines that the user registration is completed and the administrator wishes to finish the user registration (S240: YES), the MFP 1 terminates the flow.

Figure 7:
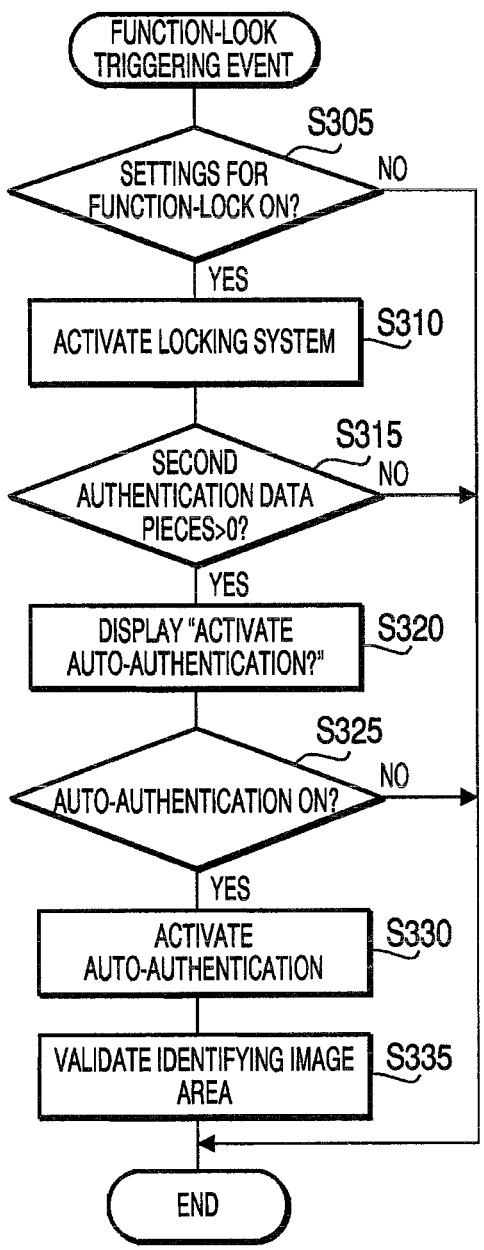
FIG. 7 is a flowchart to illustrate a function-locking flow executed in the MFP according to the embodiment of the present invention.

Next, a flow of function-locking in the MFP 1 will be described with reference to FIG. 7. The flow of function-locking is activated upon a triggering event in S115, which is manipulation of the corresponding key by the administrator of the MFP 1. In the function-locking flow, authentication of users in the second authentication method can be validated so that a locking system to restrict usage of the functions of the MFP 1 according to the functional limitation registered in the functional limitation storage area 14A on basis of the user is activated.

When the flow starts, in S305, the MFP 1 judges as to whether the MFP 1 has necessary information to activate a locking system to lock the functions of the MFP 1. The necessary information to activate a locking system may be, for example, the information registered in the user registration in S205-S240.

Therefore, when at least one user name is registered and when limitation on the functions for the user is registered, the MFP 1 determines that MFP 1 has the necessary information to activate the locking system for the user.

In S305, when the MFP 1 judges that the MFP 1 does not have the necessary information to activate the locking system (S305: NO), the MFP 1 terminates the flow. When the MFP 1 judges that the MFP 1 has the necessary information to activate the locking system (S305: YES), in S310, the MFP 1 activates the locking system. When the locking system is activated, the activation is indicated, for example, by a flag in a predetermined memory area in the MFP 1 to be referred to in the succeeding steps (see S405 in FIG. 8).

In S315, the MFP 1 examines a number of pieces of second authentication data and judges as to whether the number is greater than zero (0). In other words, the MFP 1 judges as to whether at least one piece of second authentication data is registered. When the number of pieces of registered second authentication data is zero (S315: NO), the MFP 1 cannot authenticate users in the second authentication method; therefore, the MFP 1 terminates the flow. In this regard, the MFP 1 will authenticate users solely in the first authentication method.

In S315, when the number of pieces of registered second authentication data is greater than zero (S315: YES), the MFP 1 can authenticate users in the second authentication method. In S320, the MFP 1 presents a message to the administrator through the display unit 19. In the message, the MFP 1 asks the administrator as to whether "auto-authentication," which is authentication according to the second authentication method, is to be activated. The administrator can manipulate the operation unit 18 to enter the instruction concerning activation of auto-authentication.

When the administrator's instruction is entered, in S325, the MFP 1 judges as to whether the auto-authentication is to be activated. When the auto-authentication is not to be activated (S325: NO), the administrator's instruction means that the second authentication method is not to be used. Therefore, the MFP 1 terminates the flow. In this regard, the MFP 1 will authenticate users solely in the first authentication method.

When the auto-authentication is to be activated (S325: YES), the administrator's instruction means that the second authentication method is to be used. Therefore, in S330, the MFP 1 activates the auto-authentication. Further, in S335, the MFP 1 validates the identifying image area of an original sheet. Thereafter, the MFP 1 terminates the flow. In this regard, the MFP 1 can authenticate users both in the first authentication method and the second authentication method.

The identifying image area validated in S335 refers to the identifying image area A3 as described above with reference to FIGS. 3A, 3B, 4A, and 4B. In this regard, a positional option of the identifying image area among the first through fourth options and a range of the length L2 can be determined by the administrator when the administrator enters the instruction in S330 by manipulation of the operation unit 18. If the length L2 is preliminarily determined, and if necessary, the administrator may modify the length L2 in this regard.

Figure 8:
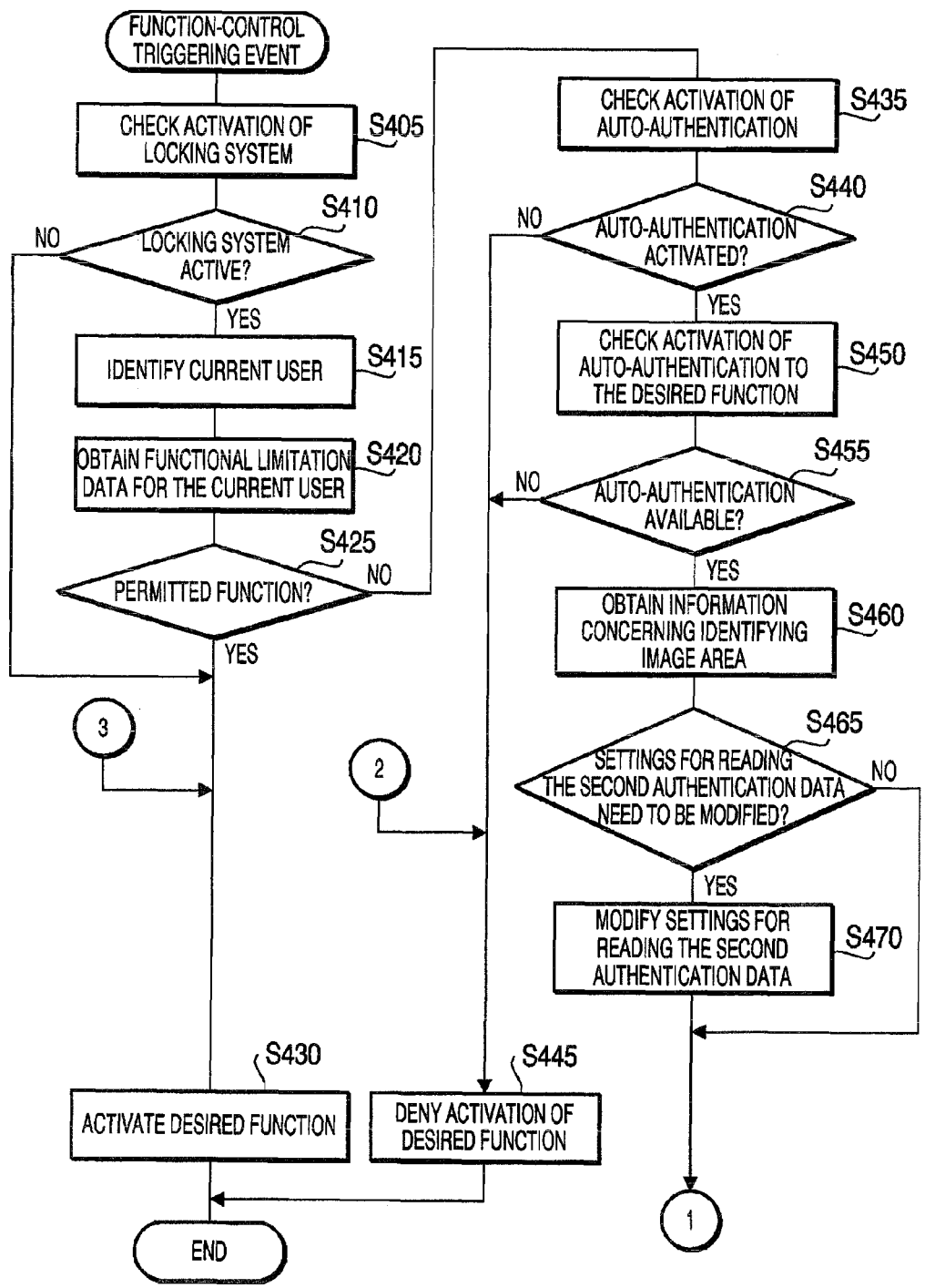
FIG. 8 is a flowchart to illustrate a function controlling flow executed in the MFP according to the embodiment of the present invention.
Figure 9:
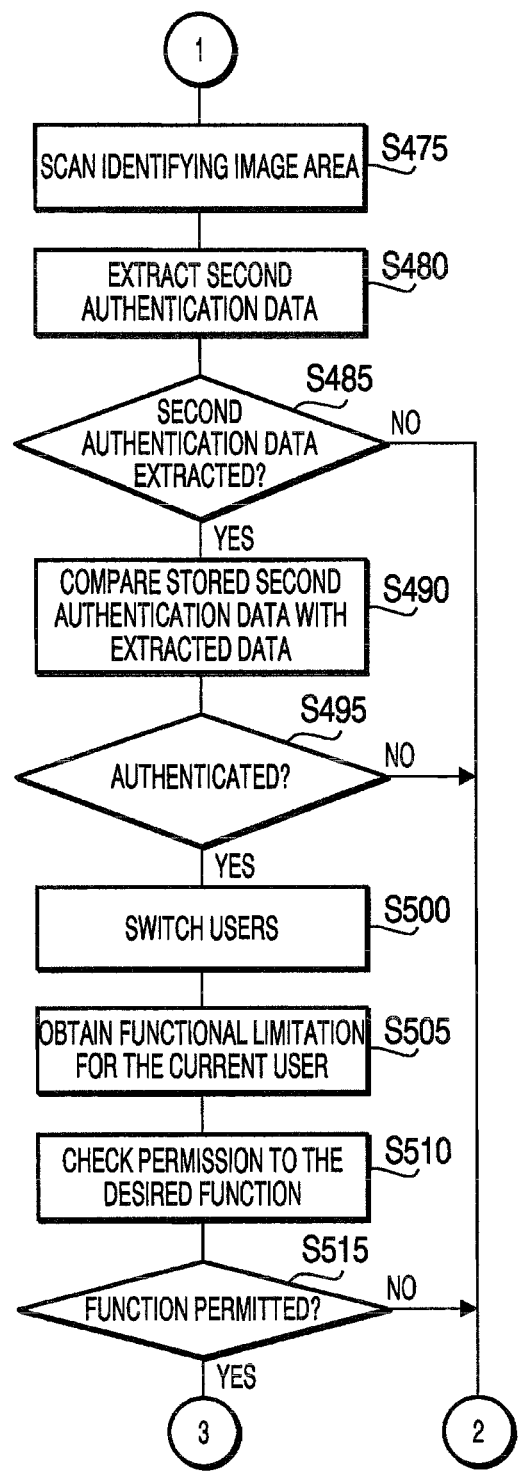
FIG. 9 is a flowchart to illustrate the function controlling flow executed in the MFP according to the embodiment of the present invention.

Next, a flow of function-controlling will be described with reference to FIGS. 8 and 9. The flow of function-controlling is activated upon a triggering event in S115, which is manipulation of the corresponding key by the administrator and other user of the MFP 1. The triggering event refers to a user's instruction to call a desired function in the MFP 1.

In the flow of function-controlling, the functions of the MFP 1 (e.g., copier function, facsimile transmission, etc.) can be activated. Although detailed behaviors to be controlled may vary depending on the function being activated, the functions of the MFP 1 are activated similarly in the function-controlling flow. Therefore, behaviors specifically relating to the present invention in the function-controlling flow, such as behaviors concerning user authentication and permission to activation of the function, are common among the plurality of functions in the MFP 1. Therefore, the following description will not specifically refer to any of the functions to be activated.

When the flow starts, in S405, the MFP 1 obtains information concerning activation of the locking system. In S410, the MFP 1 judges as to whether the locking system is activated. In particular, the MFP 1 inspects presence and absence of the flag stored in the predetermined memory area indicating the activation of the locking system (see S310 in FIG. 7).

In S410, if the MFP 1 judges that the locking system is active (S410: YES), in S415, the MFP 1 identifies the user who has logged in. Further, in S420, the MFP 1 obtains the functional limitation for the user.

In particular, when the user is authenticated according to the first authentication method and has logged in the MFP 1, the name of the user is stored in a predetermined memory area. Therefore, in S415, the MFP 1 refers to the predetermined memory area to obtain the user name therefrom and identifies the current user. When the user fails in authentication, or when a predetermined time period elapses after successful authentication, the MFP 1 operates in the public mode, in which usage of the functions is permitted or restricted in accordance with information registered with the user name "Public." Therefore, when the user has logged in with the user name "Public," the user name "Public" is stored in the predetermined memory area. Thus, the MFP 1 refers to the predetermined memory area and obtains the user name "Public" to recognize that the MFP 1 is operating in the public mode.

In S420, the MFP 1 searches the functional limitation storage area 12A to detect a data set including the identified user name. Thus, the data set corresponding to the current user is obtained. In this regard, when the MFP 1 is operating in the public mode, the data set corresponding to "Public" is obtained.

In S425, the MFP 1 determines usability of the function desired by the current user. In particular, the MFP 1 judges as to whether usage of the desired function is permitted to the current user based on the data set obtained in S420. The desired function is the function called in the triggering event to activate the function-controlling flow. For example, when the user with the user name "User1" (see FIG. 2A) is the current user, and the current user wishes to use the MFP 1 for facsimile transmission, in S425, the MFP 1 judges that the current user is permitted to use the facsimile transmission function. For another example, when the user with the user name "User3" is the current user, and the current user wishes to use the MFP 1 for facsimile transmission, in S425, the MFP 1 judges that the current user is not permitted to use the facsimile transmission function.

Further, in S425, the MFP 1 refers to history of the desired function having been used by the current user. The history indicating the number of times, in which the function has been used by the current user, is recorded in a predetermined area of the storage unit 14. The number is incremented by one each time the same user activates the function. In S425, therefore, the MFP 1 refers to the history and when the MFP 1 finds that the number indicated in the history is equal to or exceeds the permitted number (see FIG. 2A), it indicates that the current user has used the function in the past up to the limited number of times. Therefore, the current user is no longer permitted to use the function. When the MFP 1 finds that the number indicated in the history is within the permitted number, the current user is permitted to use the desired function.

In S425, when the MFP 1 judges that the desired function is permitted to the current user (S425: YES), in S430, the MFP 1 activates the desired function and terminates the function-controlling flow. In S410, when the MFP 1 judges that the locking system is not activated (S410: NO), the MFP 1 also activates the desired function and terminates the function-controlling flow.

In S430, the function desired by the user, e.g., printing, scanning, copier, facsimile transmission, i-FAX transmission, Scan-to-USB, is activated. When the desired function (e.g., copier) requires scanning of a processible image, scanning of the first processible image area A1 and the second processible image area A2 is conducted in S430. Detailed behaviors of the MFP 1 in S430 utilizing the desired function are equivalent to the behaviors of a conventional MFP; therefore, description of those will be omitted.

In S425, when the MFP 1 judges that the desired function is not permitted to the current user (S425: NO), in S435, the MFP 1 obtains information concerning activation of the auto-authentication (see S330 in FIG. 7). In S440, the MFP 1 judges as to whether the auto-authentication is active based on the obtained information.

In S440, if the MFP 1 judges that the auto-authentication is not active (S440: NO), in S445, the MFP 1 denies the current user activation of the desired function and terminates the function-controlling flow. According to this flow, when the current user is not permitted to use the desired function on basis of the first authentication method (S425: NO), and when the current user is not authenticated in the second authentication method due to inactivation of the auth-authentication (S440: NO), the current user is not provided with further means to cure the restriction. Therefore, the flow is directed to S445, in which usage of the desired function by the current user is denied. In this regard, in S445, the MFP 1 informs the current user of the denial by, for example, a message displayed in the display unit 19.

In S440, if the MFP 1 judges that the auto-authentication is activated (S440: YES), in S450, the MFP 1 obtains information concerning availability of auto-authentication based on the function desired by the user, and in S455, the MFP 1 judges as to whether the auto-authentication is available to the desired function.

According to the present embodiment, availability of auto-authentication is preliminarily determined based on as to whether the desired function requires a scanning behavior of the scanner unit 12. For example, when the desired function is facsimile transmission, which involves the scanner unit 12 to read the original sheet, the auto-authentication is available. For another example, when the desired function is printing, which does not involve the scanner unit 12, the auto-authentication is unavailable.

In S455, if the MFP 1 judges that the auto-authentication is unavailable (S455: NO), in S445, the MFP denies activation of the desired function and terminates the function-controlling flow.

In S455, if the MFP 1 judges that the auto-authentication is available (S455: YES), in S460, the MFP 1 obtains information concerning of the identifying image area A3. Further, in S465, the MFP 1 judges as to whether the MFP 1 is required to change settings for reading the second authentication data.

The information concerning the identifying image area A3 refers to settings indicating a side of the original sheet (i.e., the obverse side D1 or the reverse side D2), a position (i.e., the length L2) on the side. The settings of the identifying image area A3 have been determined by the administrator in advance. Therefore, in S460, the MFP 1 obtains the information indicating the settings and, if necessary, modifies parameters to control the scanner unit so that the scanner unit 12 scans a correct range corresponding to the identifying image area A3.

In S465, specifically, the MFP 1 determines that modification of the scanning settings to read the second authentication data is required when: the behavior required in the desired function involves scanning of solely the obverse side D1 of the original sheet and the identifying image area A3 is arranged on the reverse side D2; and the behavior required in the desired function involves scanning of solely the reverse side D2 of the original sheet and the identifying image area A3 is arranged on the obverse side D1. In other words, when scanning of single-side only is instructed by the user although practically both sides need to be scanned, the MFP 1 determines that modification of scanning settings is required.

In S465, when the MFP 1 determines that modification of scanning settings is required (S465: YES), in S470, the MFP 1 modifies the scanning settings accordingly. The flow proceeds to S475 (see FIG. 9). In S465, when the MFP 1 determines that modification of scanning settings is not necessary (S465: NO), the MFP 1 skips S470 and proceeds to S475.

In S475, the MFP 1 scans the identifying image area A3. In S480, the MFP 1 analyzes the image data obtained from the identifying image area A3 and extracts a candidate image for the second authentication data. In particular, the MFP 1 detects and extracts pixels containing a color component of specific ink from the read image. Thus, an image of the imprinted personal seal of the current user is obtained.

In S485, the MFP 1 judges as to whether a candidate image for the second authentication data is successfully extracted. If the MFP 1 judges that the candidate image is not extracted (S485: NO), the flow proceeds to S445 (see FIG. 8), in which the MFP 1 denies the current user activation of the desired function and terminates the function-controlling flow.

If the MFP 1 judges that the candidate image is extracted (S485: YES), in S490, the MFP 1 refers to the identifying image storage area 14B and compares the image data representing the candidate image, extracted in S480, with the second authentication data registered in the identifying image storage area 14B. In S490, matching of the image data representing candidate image and the registered second authentication data can be examined by a known image matching algorithm for personal seals. In this regard, the buffer area 14D is used for calculation concerning the image matching. For example, one of the extracted and registered images is rotated to be laid over the other of the images, and commonality of the two images can be examined to find as to whether features of the two images coincide.

In S495, the MFP 1 judges as to whether authentication in the second authentication method is successful. In particular, the MFP 1 determines that authentication is successful when the extracted image data and the registered second authentication data are identical.

If the MFP 1 judges that authentication is not successful (S495: NO), the flow proceeds to S445, (see FIG. 8), in which the MFP 1 denies the current user activation of the desired function and terminates the function-controlling flow.

If the MFP 1 judges that authentication is successful (S495: YES), in S500, the MFP 1 switches users. For example, if the current user has logged in with the user name "User1," but the identifying image extracted approved in S490 coincides with an image represented by the second authorization data of "User3," the MFP 1 considers the current user to be "User3" and switches the user names from "User1" to "User3."

In S505, the MFP 1 obtains functional limitations for the user approved in the second authorization method (i.e., "User3" in the above example). In S510, usability of the desired function for the current approved user is examined. In S515, when the current approved user is permitted to use the desired function based on the examined usability. For example, when "User1" is the approved user, the MFP 1 refers to the functional limitation for "User1" registered in the functional limitation storage unit 14A. Specifically, when "User1" wishes to use copier, the MFP 1 refers to the functional limitation for "User1" concerning the copier function and judges the usability of the copier function for "User1."

In S515, if the MFP 1 judges that the desired function is permitted to the current approved user, the flow proceeds to S430 (see FIG. 8), in which the MFP 1 activates the desired function. The MFP 1 terminates the flow thereafter.

In S515, if the MFP 1 judges that the desired function is not permitted to the current approved user, the flow proceeds to S445 (see FIG. 8), in which the MFP 1 denies the current user activation of the desired function and terminates the function-controlling flow.

According to the above flow, the MFP 1 in the present embodiment activates a desired function, in which the processible image can be processed, when the read identifying image is approved to be an image qualifying predetermined authorization criteria. Therefore, only limited users who can form the identifying images in the identifying image area A3 are allowed to activate such a function. Further, a number of times to use the function can be controlled on the basis of an approved user so that even the approved user can be allowed to use the function within the limited number, which is assigned by the administrator.

According to the above embodiment, specifically in the second authentication method, the user is released from necessity to manually input the user name and the password to log in the MFP 1, unlike the conventional devices which can be logged in solely in the first authentication method.

In the MFP 1 according to the above embodiment, the identifying image is formed in an area (e.g., the identifying image area A3) distinctly from the processible images in the processible image areas (e.g., the first processible image area A1 and the second processible image area A2). Therefore, the identifying image is prevented from being included in the processible images. When, for example, the identifying image is included in the processible image area, and the processible image is passed (e.g., transmitted by the facsimile transmission function) to the other persons, the identifying image may be also transmitted and exposed to the others. According to the above embodiment, however, the identifying image formed in the separate identifying image area A3 is prevented from being processed or passed to the others. Therefore, the identifying image can be prevented from being exposed to the others and from being maliciously used by the others.

According to the above MFP 1, the identifying image area A3 is not fixed but can be arranged in a user's desired range, for example, as shown in FIGS. 3A, 3B, 4A, and 4B. Therefore, the user can set the identifying image in an area convenient to the user.

According to the above MFP 1, when the processible image area and the identifying image area A3 are arranged on each side of the original sheet separately (see FIG. 4B), and the reverse side D2 having the identifying image area A3 does not include a processible image area, the reverse side D2 is exclusively used by the identifying image. Therefore, the identifying image can be formed in a preferred range on the reverse side D2 with less limitation concerning the processible image area compared to the case in which one side of the original sheet is shared by the processible image area and the identifying image area.

Optionally, according to the above MFP 1, when the processible image area and the identifying image area A3 are arranged on one side of the original sheet (see FIGS. 3A, 3B, and 4A). Therefore, the processible images can be formed on the both sides D1, D2 of the original sheet to be processed by the desired function.

According to the above MFP 1, optimization of the relation among the lengths L2, L3, and the feeding speed of the original sheet enables the MFP 1 to start obtaining the processible image from the first processible image area A1 upon authentication of the image obtained from the identifying image area A3, and the MFP 1 to cancel obtaining the processible image from the first processible image area A1 upon failure of authentication. Therefore, scanning of the first processible image area A1 is prevented from being conducted in vain.

Further, the MFP 1 in the above embodiment is equipped with the functional limitation storage area 14A (see FIG. 2A); therefore, permission and restriction of the respective functions can be set personally on basis of the user.

Furthermore, the MFP 1 in the above embodiment is capable of scanning the obverse side D1 and the reverse side D2 concurrently to read the processible images and the identifying image by the first image sensor 12A and the second image sensor 12B respectively. Therefore, the images formed on the both sides can be read in a shorter period of time compared to a case in which the obverse side and the reverse side of the original sheet are sequentially scanned by a single image sensor. Further, when the obverse side D1 and the reverse side D2 are scanned by the first image sensor 12A and the second image sensor 12B respectively, configuration of the original feeder unit 12 can be less complicated compared to a case in which a feeder unit feeds the original sheet to have one side firstly and the other side thereafter scanned by the single image sensor.

Although an example of carrying out the invention has been described, those skilled in the art will appreciate that there are numerous variations and permutations of the image processing device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiment, the MFP 1 is capable of scanning a single side only and of scanning both sides selectively. However, the present invention can be similarly applied an MFP capable of scanning a single side only. In this configuration, one side of the original sheet is shared by the processible image area and the identifying image area, and the processible image and the identifying image are scanned from the one side of the original sheet. Therefore, one of the two image sensors 12A, 12B ban be omitted, and configuration of the scanner unit 12 can be less complicated.

For another example, the identifying image may not necessarily be an imprinted personal seal, but may be, for example, a hand-written or printed character string, a fingerprint, a bar-code, and a two-dimensional code, which can be optically read by an image sensor. When a hand-written image is used as the identifying image, a technique to analyze hand-written images by, for example, extracting hand-written features from the image to identify the user needs to be installed in the MFP. When a fingerprint is used as the identifying image, a technique to identify the user based on the fingerprint needs to be installed. When a bar-code or a two-dimensional code is used as the identifying image, similarly, a technique to analyze the code needs to be installed.

What is claimed is:

1. A copier machine, comprising:
   a scanner configured to read an image formed on an original sheet;
   an image forming unit configured to form a copied image on a recording sheet based on image data representing the image read by the scanner; and
   a control unit configured to control the scanner and the image forming unit and control a copier function of the copier machine to duplicate the original sheet by executing:
   a first authorization step, in which judgment is made whether predetermined user information was entered, the predetermined user information identifying a user who is authorized to use the copier machine;
   a reading step, in which, after the first authorization step and when the user is authorized to use the copier machine, the scanner is manipulated to read the image formed on the original sheet;
   an obtaining step, in which authentication data representing a personal identifying image of the user is obtained from the image data representing the image read by the scanner; and
   a second authorization step, in which judgment is made whether the authentication data obtained from the image data in the obtaining step indicates permission associated with the predetermined user information for the user to use the copier function,
   wherein the control unit forms the copied image on the recording sheet when judgment is made that the authentication data indicates permission for the user to use the copier function in the second authorization step, and restricts forming of the copied image when judgment is made that the authentication data does not indicate permission for the user to use the copier function;
   wherein, when the user identified by the predetermined user information in the first authorization step and the user permitted to use the copier function in the second authorization step are different, the control unit forms the copied image by the copier function permitted to the user permitted in the second authorization step and restricts forming of the copied image by the copier function permitted to the user identified in the first authorization step.

2. The copier machine according to claim 1, wherein the authentication data is obtained by the scanner reading a predetermined area set in the original sheet.

3. The copier machine according to claim 1, wherein the predetermined user information is a password being entered by the user.

4. The copier machine according to claim 1, further comprising:
a storage unit,
wherein the storage unit stores a table, in which the authentication data of the user to be judged in the second authorization step is associated with the user.

* * * * *